(12) United States Patent
Udeshi (10) Patent No.: US 6,816,170 B1
(45) Date of Patent: Nov. 9, 2004

(54) SYSTEM AND METHOD FOR ROBUST AND EFFICIENT RESIZING OF SIMPLE POLYGONS

(75) Inventor: Tushar J. Udeshi, Richardson, TX (US)

(73) Assignee: Zyvex Corporation, Richardson, TX (US)

( * ) Notice: Subject to any disclaimer, the term of this patent is extended or adjusted under 35 U.S.C. 154(b) by 212 days.

(21) Appl. No.: 10/080,984

(22) Filed: Feb. 22, 2002

(51) Int. Cl.[7] .................................................. G09G 5/00
(52) U.S. Cl. .................. 345/660; 345/670; 345/671; 345/472; 345/472.1; 345/472.2
(58) Field of Search ................................. 345/660, 670, 345/671, 472, 472.1, 472.2

(56) References Cited

U.S. PATENT DOCUMENTS 6,577,991 B1 * 6/2003 Yoshizawa ...................... 703/6

OTHER PUBLICATIONS

Cheng, Siu–Wing et al., "Motorcycle Graphs and Straight Skeletons," Dept. of Computer Science, Hong Kong University of Science & Technology, Clear Water Bay, Kowloon, Hong Kong. Nov. 22, 2001.

Eppstein, David et al., "Raising Roofs, Crashing cycles, and Playing Pool: Applications of a Data Structure for finding Pairwise Interactions," ACM Sympos. Comput. Geom., 58–67, 1995.

Phahlamohlaka, Letlibe Jacob, "Offset Problems for Polygons," Dalhousie University, Halifax, Canada Apr. 1991.

Melkman, A.A., "Computing the convex hull of a simple polygon in O(n) time with A.A. Melkman's algorithm," printed from http://www.cs.mcgill.ca/~plang/copgeo/copgeo.html, pp 1–5 with 13 pages of java code.

(List continued on next page.)

*Primary Examiner*—Matthew C. Bella
*Assistant Examiner*—Tam Tran
(74) *Attorney, Agent, or Firm*—Haynes and Boone, LLP.

(57) ABSTRACT

A system and method are disclosed that enable robust resizing of a simple polygon in a computationally inexpensive manner. A preferred embodiment is operable to handle various resizing events that may be encountered when resizing a simple polygon, such as self-intersection, edge-collapse, and edge-split events, in order to accurately generate the correct resized polygon. Further, a preferred embodiment is operable to compute a resulting resized polygon with efficiency of O(n log n), even if one or more of the above types of events is encountered during the resizing process. Embodiments of the present invention handle resizing events for simple polygons (both convex and non-convex) without requiring construction of the straight skeleton of the polygons being resized. Also, embodiments of the present invention are operable for resizing simple polygons that may include holes.

65 Claims, 6 Drawing Sheets

OTHER PUBLICATIONS

Aurenhammer, Franz, "Straight skeleton of a simple polygon," printed from website: compgeom.cs.uiuc.edu/~jeffe/open/skeleton.html, Jan. 29, 2002, 1–1.

Aichholzer, Owsin et al., "Straight Skeletons for General Polygonal Figures in the Plane," Proc. $2^{nd}$ Ann. Int. Conf. Computing and Combinatorics (COCOON /96), 117–126.

Lang, Robert J., "A Computational Algorithm for Origami Design," Proc. $12^{th}$ Ann. ACM Symp. Computational Geometry, 98–105, 1996.

Eppstein, David "Fast Hierarchical Clustering and Other Applications of dynamic Closest Pairs," Dept. of Information and Computer Science, Univ. of California, pp. 1–10.

Kalmanovich, G. et al., "Swift and stable polygon growth and broken line offset," Computer–aided Design, vol. 30(11) 847–852, 1998.

Chin, Francis et al., "Finding the Medial Axis of a Simple Polygon in Linear Time," ISAAC–$6^{th}$ Int'l Symp. on Alogorithms and Computation, 382–391, 1995.

Lauther, Ulrigh, "An 0 (N log N) Algorithm For Boolean Mask Operations," Proc. $18^{th}$ Design Automation Conference, 555–562, 1981.

Melkman, A.A., "On–Line Construction of the Convex Hull of a Simple Polyline," Information Processing Letters 25 11–12, 1987.

Pham, B., "Offset Curves and Surfaces: a brief survey," Computer Aided Design 24, 223–229 1992.

Tiller, Wayne et al., "Offsets of Two–Dimensional Profiles," IEEE Computer Graphics & Applications, 36–46, 1984.

Felkel, Petr et al., "Straight Skeleton Implementation," Proceedings of Spring Conference on Computer Graphics, Budmerice, Slovakia, 1998 pp. 210–218, (cited here in re–print format as pp. 1–10).

Aichholzer, Oswin et al., "A Novel Type of Skeleton for Polygons," Journal of Universal Computer Science, 1 (12), pp 752–761, 1995. Copy furnished herewith printed from Internet at http://citeseer.nj.nec.com/alberts95novel.html–13 9 pages.

* cited by examiner

| PRIORITY QUEUE | |
|---|---|
| EDGE $E_1$ | DISTANCE TO DP=$DD_1$ |
| EDGE $E_2$ | DISTANCE TO DP=$DD_2$ |
| EDGE $E_3$ | DISTANCE TO DP=$DD_3$ |
| ⋮ | ⋮ |

SYSTEM AND METHOD FOR ROBUST AND EFFICIENT RESIZING OF SIMPLE POLYGONS

TECHNICAL FIELD

The present invention relates in general to systems and methods for representing polygons and determining the result of a resizing operation performed on a polygon, and more specifically to a system and method for accurately and efficiently computing a simple polygon (i.e., non-self-intersecting polygon) that results from a resizing operation performed on an original simple polygon.

BACKGROUND OF THE INVENTION

Polygons are commonly utilized in a wide range of applications. For instance, polygons are often used in computer graphics. For example, computer-executable design applications often utilize polygons in defining a particular design (or layout). For instance, computer-executable applications for designing circuit layout, micro-mechanical device layout, and/or micro-electromechanical system (MEMS) layout, as examples, commonly use polygons in representing such layouts. Other example applications of polygons include uses in design and/or manufacturing in, for instance, generation of architectural designs of buildings, generation of representation of geographical terrain, generation of ornamental patterns for numerical control of sewing machines in the textile industry, numerical control of milling machines in the car body industry, mould design, design of solid fuel combustion chambers, the propagation of travelling shock waves, and obstacle avoidance problems of robotics. See e.g., Pham, B., "Offset curves and surfaces: a brief survey," Computer Aided Design 24, pp. 223–229, 1992.

Many applications utilize "simple polygons," which as used herein refers to polygons that are non-self-intersecting (but which may include holes therein). That is, a simple polygon is a polygon that does not intersect with itself (i.e., does not include edges that intersect each other). It should be noted that self-intersecting polygons can be decomposed into simple polygons. Thus, applications that include self-intersecting polygons may use simple polygons for representing the self-intersecting polygons and/or for manipulating the polygons (e.g., resizing the polygons).

Once a polygon is defined, it is often desired to resize it. That is, it is often desired to have the edges of the polygon moved outward (by a particular offset amount) to enlarge the polygon or moved inward (by a particular inset amount) to decrease the size of the polygon. Offsetting a polygon involves moving its boundary outward a particular distance (e.g., which is typically some user-specified distance in most applications) in a direction normal to the polygon's boundary. Insetting moves the edges into the polygon. Resizing of a polygon (i.e., offsetting or insetting of the polygon) is a primitive operation that is required in a variety of applications, such as the example applications identified above. Resizing (e.g., offsetting or insetting) a polygon is sometimes referred to as polygon growth or polygon envelope.

As is well known in the art, various problems may be encountered when resizing a simple polygon. For instance, when resizing a polygon, any of several different types of events (which may be referred to herein as "resizing events" or as "critical events") may be encountered. More specifically, the geometry of a polygon may change significantly when an offset or inset operation is performed. One event that may be encountered is referred to herein as a "self-intersection" event in which a simple polygon intersects with itself as a result of a resizing operation. Another event that may be encountered is referred to herein as an "edge-collapse" event in which an edge of the polygon effectively disappears as a result of a resizing operation. That is, the two vertices of an edge may become one as a result of a resizing operation, thereby causing such edge to effectively disappear. Another event that may be encountered is referred to herein a "polygon-split" event in which the polygon is effectively split into two (or more) separate polygons as a result of a resizing operation. Accordingly, it becomes desirable to have an algorithm for resizing polygons that robustly and efficiently handles such events that may be encountered during a resizing operation to accurately determine the polygon that results from such resizing operation.

The above events have been recognized in the prior art as events that need to be accounted for when performing resizing operations on a polygon. Various techniques for handling such events have been proposed in the prior art. As one example, a common approach for addressing the problems associated with offsetting a simple polygon is described by Tiller, W. and Hanson, H.G., "Offsets of two-dimensional profiles," IEEE Computer Graphics and Applications 5, pp. 36–46, 1984. In this approach, a local offset of each edge of the polygon is performed first (i.e., every edge is moved a user-specified distance), and then an attempt is made to eliminate self-intersections and loops produced in the resulting polygon. That is, the local offsetting may lead to self-intersections and/or loops in the resulting offset polygon, and the ones of such self-intersections and/or loops that are "not needed" are discarded. The process of identifying the loops that are "not needed" is heuristic and is not guaranteed to work for all inputs. Accordingly, this procedure is heuristic in nature and does not provide a robust solution for resizing polygons.

More robust algorithms for performing resizing operations on a polygon have been proposed in the prior art that utilize the "straight skeleton" (which may also be referred to as the "lineal axis") of the polygon in performing the resizing operation in order to handle one or more of the above-identified types of resizing events that may be encountered. That is, robust polygon resizing techniques of the prior art require first computing the straight skeleton of the polygon being resized. In general, the straight skeleton of a simple polygon is defined by shrinking the polygon by translating each of its edges at a fixed rate, keeping sharp corners at the reflex vertices, and monitoring where the vertices go. The straight skeleton is quite similar to the medial axis. In fact, the two are equivalent for convex polygons. However, the straight skeleton of a non-convex polygon has fewer edges than the medial axis, and all of its edges are line segments (the medial axis also has parabolic arcs around each reflex vertex). Computing the straight skeleton of a polygon is further described by Petr Felkel and Stepan Obdrzalek in "Straight Skeleton Implementation," Proceedings of Spring Conference on Computer Graphics, Budmerice, Slovakia, ISBN 80-223-0837-4, pp. 210–218, 1998, and by Letlibe Phahlamohlaka in "Offset Problems for Polygons," Masters thesis, Dept. of Mathematics, Statistics and Computer Science, Dalhousie University, Canada, 1991.

Once the straight skeleton data structure of a polygon has been computed, one can easily compute the insetted polygon. That is, the straight skeleton, by definition, detects all events when the polygon is inset. I am unaware of any teaching in the prior art of extending the straight skeleton algorithm to detect events that occur during an offset operation. Also, the straight skeleton provides a solution for edge-collapse and polygon-split events, but further computation is still required to generate a correct result when a self-intersection event is encountered.

As described further below, the robust resizing techniques of the prior art that require computation of the straight skeleton of a polygon are computationally expensive. In the case of convex polygons, resizing events can be determined by determining the medial axis of the polygon being resized. See Letlibe Phahlamohlaka, "Offset Problems for Polygons," Masters thesis, Dept. of Mathematics, Statistics and Computer Science, Dalhousie University, Canada, 1991. The medial axis of a polygon can be constructed in linear time (see e.g., Francis Chin, Jack Snoeyink, and Cao An Wang, "Finding the Medial Axis of a Simple Polygon in Linear Time," Proc. 6$^{th}$ Ann. Int. Symp. Algorithms and Computation (ISAAC '95), Lecture Notes in Computer Science 1004, pp. 382–391, 1995). For non-convex polygons, however, the medial axis is not suitable for determining resizing events, and therefore robust algorithms of the prior art utilize the straight skeleton of such non-convex polygons to detect resizing events.

Although the medial axis of a polygon can be constructed in linear time, the fastest known algorithms for computing straight skeletons are much slower. The following table (Table 1) lists the time and space bounds of various algorithms proposed in the prior art for computing straight skeletons wherein n is the total number of vertices of the polygon, r is the number of reflex (non-convex) vertices of the polygon, and e is an arbitrarily small positive constant:

TABLE 1

| Computational Efficiency (i.e., Computational Time) | Storage Efficiency (i.e., Storage Space) | Reference(s) Proposing Algorithm |
| --- | --- | --- |
| $O(n^2 \log n)$ | $O(n)$ | [B] |
| $O(n^{1.5} \log n)$ | $O(n \log n)$ | [G] |
| $O(nr \log n)$ | $O(nr)$ | [A, D] |
| $O(n^2)$ | $O(nr)$ | [D] |
| $O(n \log n + nr \log (n/r))$ | $O(nr)$ | [A, C, D] |
| $O(n \log n + nr + r^2 \log r)$ | $O(n)$ | [B, D] |
| $O(nr + n \log n)$ | $O(n + r^2)$ | [A, C, D, F] |
| $O(n^{1+e} + n^{8/11+e}r^{9/11+e})$ | $O(n^{1+e} + n^{8/11+e}r^{9/11+e})$ | [D] |

The references proposing an algorithm having the corresponding time and space requirements shown in Table 1 are identified therein as follows: A) Oswin Aichholzer, Franz Aurenhammer, David Alberts, and Bernd Gartner, "A Novel Type of Skeleton for Polygons", Journal of Universal Computer Science, 1 (12), pp. 752–761, 1995; B) Oswin Aichholzer and Franz Aurenhammer, "Straight Skeletons for General Polygonal Figures in the Plane," Proc. 2$^{nd}$ Ann. Int. Conf. Computing and Combinatorics (COCOON '96), pp. 117–126, Lecture Notes in Computer Science 1090, Springer-Verlag, 1996; C) David Eppstein, "Fast hierarchical clustering and other applications of dynamic closest pairs," manuscript, July 1997; D) David Eppstein and Jeff Erickson, "Raising roofs, crashing cycles, and playing pool: applications of a data structure for finding pairwise interactions," manuscript, July 1998 (an extended abstract of this paper was presented at Proc. 14$^{th}$ Annu. A CM. Symp. Computational Geometry, pp. 58–67, 1998); E) Robert Lang, "A Computational Algorithm for Origami Design," Proc. 12$^{th}$ Ann. ACM Symp. Computational Geometry, pp. 98–105, 1996; F) Petr Felkel and Stepan Obdrzalek, "Straight Skeleton Implementation," Proceedings of Spring Conference on Computer Graphics, Budmerice, Slovakia, ISBN 80-223-0837-4, pp. 210–218, 1998; and G) Siu-Wing Cheng and Antoine Vigneron, "Motorcycle Graphs and Straight Skeletons," Proc. 13$^{th}$ Annu. ACM-SIAM Symposium on Discrete Algorithms, pp. 156–165, 2002.

Robust solutions for resizing polygons that have been proposed in the prior art generally utilize a straight skeleton, which results in the solutions being computationally expensive, as described in conjunction with Table 1 above. For instance, such algorithms proposed in the prior art have a running time greater than 0(n log n) (i.e., "on the order of" n log n). For example, Aichholzer et al. propose an algorithm for computing straight skeletons in "Straight Skeletons for General Polygonal Figures in the Plane" that requires $O(n^2 \log n)$ time in the worst case. In "A Novel Type of Skeleton for Polygons," Aichholzer et al. propose an algorithm for computing straight skeletons that has a running time of $O(nr \log n)$, which may, in the worst case, be $O(n^2 \log n)$ since r can be O(n). Aichholzer et al. recognized that such algorithm can be further improved to $O(nr+n \log n)=O(n^2)$ using a quadtree-like data structure of size O(nr). See also, Felkel P. and Obdrzalek, S., "Straight Skeleton Computation," Lazlo Szirmay-Kalos, editor, Spring Conference on Computer Graphics, Budmerice, Slovakia, pp. 210–218, (April) 1998.

Eppstein et al. proposed the most computationally efficient algorithm of which I am aware for computing the straight skeleton of a polygon, which runs in $O(n^{17/11+e}$ (where "e" is an arbitrarily small positive constant) and such algorithm is relatively complicated to implement. See "Raising roofs, crashing cycles, and playing pool: applications of a data structure for finding pairwise interactions," manuscript, July 1998 (extended abstract presented at Proc. 14th Annu. ACM. Symp. Computational Geometry, pp. 58–67, 1998). Accordingly, the computational requirement with the best known technique increases at a rate of $n^{17/11+e}$ as the number "n" of vertices of a polygon increases.

Siu-Wing et al. propose an algorithm to calculate the straight skeleton of a polygon within running time of $O(n^{1.5} \log n)$, but it is not robust because it fails for some special cases, as described in "Motorcycle Graphs and Straight Skeletons," Proc. 13$^{th}$ Annu. ACM-SIAM Symposium on Discrete Algorithms, pp. 156–165, 2002. For those special cases, Siu-Wing et al. revert to the algorithm proposed by Eppstein et al. Thus, the best known general, robust algorithm for calculating a straight skeleton is that proposed by Eppstein et al., which runs in $O(n^{17/11+e})$, although the algorithm proposed by Siu-Wing et al. has a slightly better run time of $O(n^{1.5} \log n)$ for most cases. Also, Siu-Wing et al. is the only reference of which I am aware that addresses using a straight skeleton algorithm for polygons with holes.

Additionally, Kalmanovich et al. have proposed an algorithm to offset an arbitrary polygon which has an expected (but not guaranteed) performance of O(n log n). Kalmanovich G. and Nisnevich G., "Swift and stable polygon growth and broken line offset," Computer-aided Design, Vol. 30(11) (1998) pp. 847–852. The approach proposed by Kalmanovich et al. does not compute a polygon's straight skeleton. However, the algorithm proposed by Kalmanovich et al. is heuristic in nature and is not robust because it may output some spurious edges (which the authors refer to as "dead-zone edges").

BRIEF SUMMARY OF THE INVENTION

In view of the above, robust techniques proposed in the prior art for resizing polygons generally utilize a straight skeleton, which results in the techniques being undesirably computationally expensive. For example, the most computationally efficient prior art technique for robustly computing a straight skeleton of a polygon is $O(n^{17/11+e})$. Other techniques have been proposed in the prior art that are more computationally efficient, such as the heuristic approach described by Tiller et al. in "Offsets of two-dimensional profiles" and the heuristic approach described by Kalmanovich et al. in "Swift and stable polygon growth and broken line offset," but such computationally efficient techniques are less robust in that they do not produce an accurate result for all inputs (i.e., they produce incorrect results in certain cases). Accordingly, a desire exists for a system and method for robustly determining a resulting resized polygon in a computationally efficient (inexpensive) manner.

The present invention is directed to a system and method which enable robust and efficient resizing of a simple polygon. That is, according to embodiments of the present invention, a system and method are provided that enable simple resizing operations to be performed robustly (i.e., capable of generating an accurate result for all inputs) on simple polygons in a computationally inexpensive manner. A preferred embodiment provides a solution that is relatively easy to implement. A preferred embodiment is operable to handle various resizing events that may be encountered when resizing a simple polygon, such as self-intersection, edge-collapse, and edge-split events, in order to accurately generate the correct resized polygon. Further, a preferred embodiment is operable to compute a resulting resized polygon with efficiency of O(n log n), even if one or more of the above types of events is encountered during the resizing process. Embodiments of the present invention handle resizing events for simple polygons (both convex and non-convex) without requiring construction of the straight skeleton of the polygons being resized. Also, embodiments of the present invention are operable for resizing simple polygons that may include holes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Various embodiments of the present invention are now described with reference to the above figures, wherein like reference numerals represent like parts throughout the several views. According to embodiments of the present invention, a system and method are provided that enable simple resizing operations to be performed robustly (i.e., capable of generating an accurate result for all inputs) on simple polygons in a computationally inexpensive manner. A preferred embodiment provides a solution that is relatively easy to implement. A preferred embodiment is operable to handle various resizing events that may be encountered when resizing a simple polygon, such as self-intersection, edge- collapse, and edge-split events, in order to accurately generate the correct resized polygon. Further, a preferred embodiment is operable to compute a resulting resized polygon with efficiency of O(n log n), even if one or more of the above types of events is encountered during the resizing process. Additionally, a preferred embodiment utilizes 0(n) storage space. Embodiments of the present invention handle resizing events for simple polygons (both convex and non-convex) without requiring construction of the straight skeleton of the polygons being resized. Also, embodiments of the present invention are operable for resizing simple polygons that may include holes.

To have a robust solution that is capable of accurately generating the appropriate simple polygon resulting from a resizing operation, such a solution is preferably capable of accurately responding to one or more of various resizing events that may be encountered when resizing a simple polygon. Such resizing events may change the overall structure of the simple polygon being resized. As an example, certain events may result in a change in the number of edges (or vertices) that are present in the simple polygon. For instance, in resizing an original simple polygon, the resizing operation may result in a simple polygon that has fewer edges (or vertices) than the original polygon, as is explained further in the examples provided below. As another example, certain events may result in a polygon being divided into two or more separate polygons. For instance, in insetting all of the edges of an original simple polygon (in order to reduce the polygon's size), the insetting operation may result in dividing the original polygon into two or more separate simple polygons, as is explained further in the examples provided below. Various embodiments of the present invention are capable of accurately responding to at least one type of such resizing events in a computationally efficient manner. Moreover, a preferred embodiment is capable of accurately responding to any of such resizing events in order to generate the appropriate resized polygon in a computationally efficient manner.

Figure 1A:
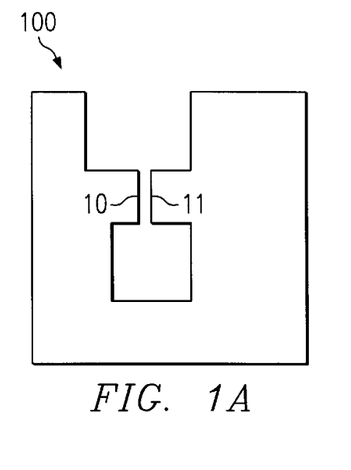
FIG. 1A shows an example simple polygon.
Figure 1B:
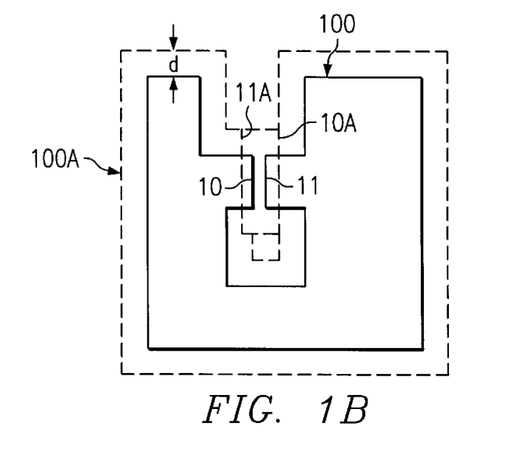
FIG. 1B shows the example simple polygon of FIG. 1A offset by distance d

A first type of resizing event that may be encountered when resizing a simple polygon is a self-intersection event. Such self-intersection event and a preferred method for accurately responding to such event are now described in conjunction with FIGS. 1A–1C. FIG. 1A shows an example simple polygon 100 that includes edges 10 and 11. Such polygon 100 may be utilized in an application, such as a MEMS layout application for example, and it may be desired to resize such polygon 100. For example, a user of the application may desire to increase the size of polygon 100 by a particular offset amount. FIG. 1B provides an example in which original polygon 100 is resized by an offset amount "d." More specifically, in such resizing operation shown in FIG. 1B, all edges of polygon 100 are offset (i.e., moved outward) by a distance d, which results in polygon 100A. It should be noted that the offset amount d is such that edges 10 and 11 of original polygon 100 intersect each other in the offset polygon 100A, shown as edges 10A and 11A, respectively, in offset polygon 100A.

Figure 1C:
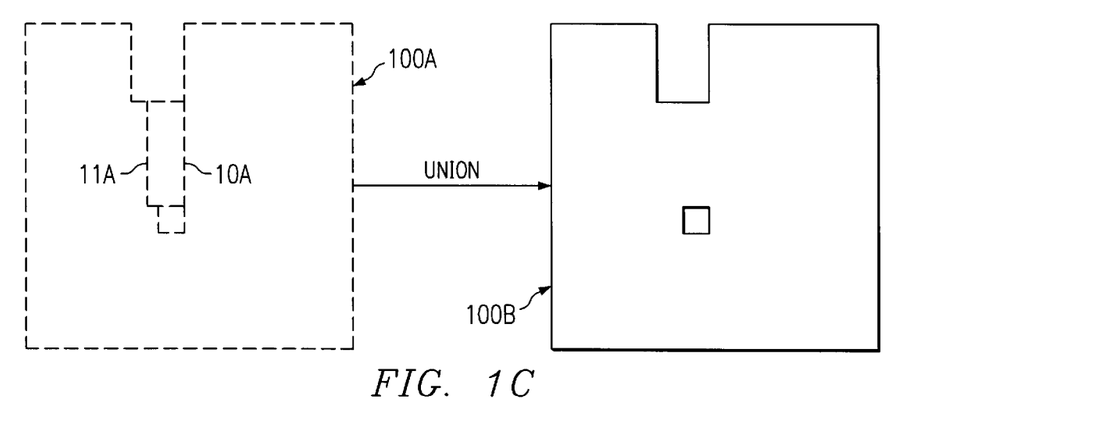
FIG. 1C shows an example of resolving a self-intersection event encountered in the polygon of FIG. 1B in accordance with embodiments of the present invention.

Having intersecting edges, such as edges 10A and 11A of offset polygon 100A is generally not desired in applications that utilize simple polygons. Thus, offset polygon 100A is not the correct result of offsetting polygon 100 by distance d because of the self-intersection event that is encountered. Accordingly, it is generally desirable for a resizing method to respond to such a self-intersection event in a simple polygon in order to generate a correct resized simple polygon. A preferred embodiment accounts for such self-intersection events by performing a union operation on the polygon after it has been resized. For example, as shown in FIG. 1C, a union operation may be performed on offset polygon 100A to result in the correct resized simple polygon 100B. More specifically, performing a union operation on offset polygon 100A resolves the intersecting of edges 10A and 11A that was encountered when offsetting all edges of original polygon 100 by distance d, and results in the proper simple polygon 100B that is generated by such offsetting. Polygon boolean operations like this union operation can be performed in a computationally efficient manner. For example, such a union operation can be performed in O(n log n) using, for example, a line-sweep algorithm, as described in Lauther, U., "An O(n log n) algorithm for boolean mask operations," Proc. 18$^{th}$ Design Automation Conference, pp. 555–56$^2$ (1981), the disclosure of which is hereby incorporated herein by reference. Further, the line-sweep algorithm uses 0(n) storage space.

Figure 2A:
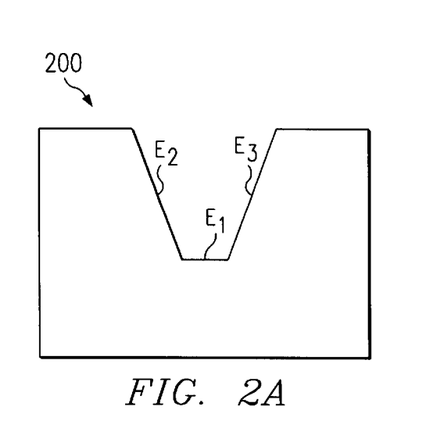
FIG. 2A shows an example simple polygon.

A second type of resizing event that may be encountered when resizing a simple polygon is an edge-collapse event. Such edge-collapse events and a preferred method for accurately responding to such events are now described in conjunction with FIGS. 2A–2C, 3A–3B, and 4A–4B. FIG. 2A shows an example simple polygon 200 that includes edges $E_1$, $E_2$, and $E_3$. Such polygon 200 may be utilized in an application, such as a MEMS layout application for example, and it may be desired to resize such polygon 200.

Figure 2B:
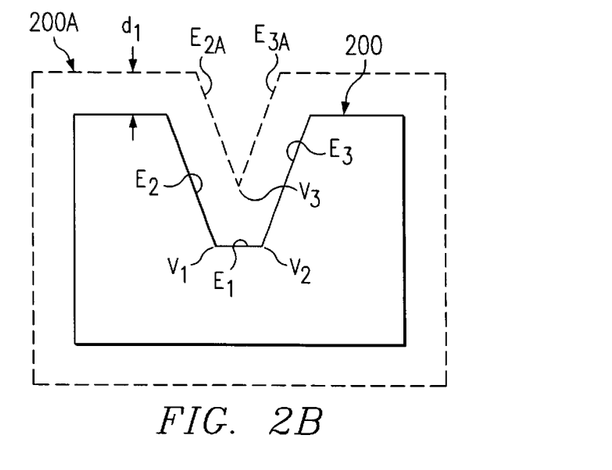
FIG. 2B shows the example simple polygon of FIG. 2A offset by distance $d_2$.

For example, a user of the application may desire to increase the size of polygon 200 by a particular offset amount. FIG. 2B provides an example in which original polygon 200 is resized by an offset amount "$d_1$". More specifically, in such resizing operation shown in FIG. 2B, all edges of polygon 200 are offset (i.e., moved outward) by a distance $d_1$, which results in polygon 200A. It should be noted that the offset amount $d_1$ is such that edge El of original polygon 200 effectively disappears in resized polygon 200A. That is, the offset operation causes the two vertices, $V_1$ and $V_2$, of edge El of original polygon 200 to become one (shown as vertex $V_3$) in resized polygon 200A. Offset edge $E_2$ is shown in resized polygon 200A as edge $E_{2A}$, and offset edge $E_3$ is shown in resized polygon 200A as edge $E_{3A}$. Because edge $E_1$ effectively disappears (or collapses) by the offset operation, such resizing event is referred to as an edge-collapse event.

Figure 2C:
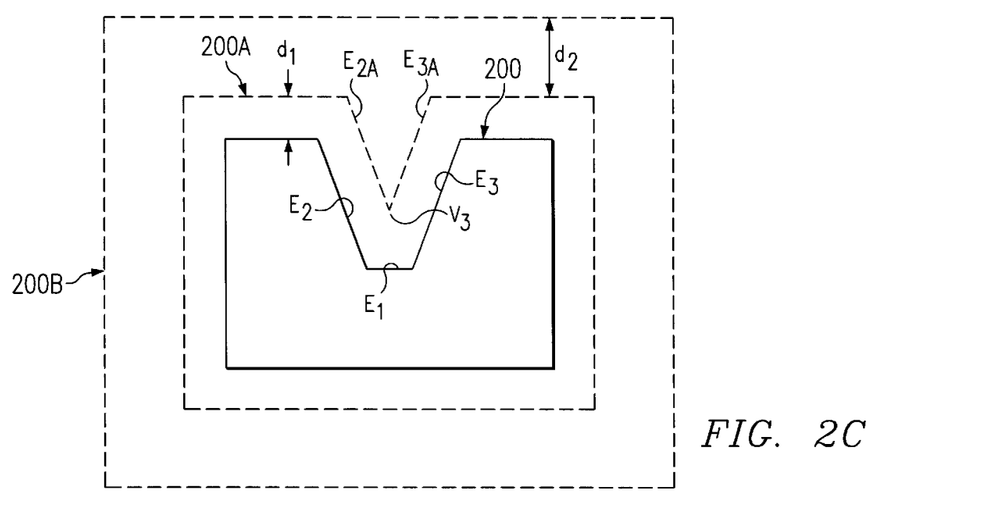
FIG. 2C shows the example offset polygon of FIG. 2B further offset by distance $d_2$.

As a further example of an edge-collapse event, a user may desire to further increase the size of polygon 200A by a particular offset amount. FIG. 2C provides an example in which polygon 200A is further resized by an offset amount "$d_2$". More specifically, in such resizing operation shown in FIG. 1C, all edges of polygon 200A are offset (i.e., moved outward) by a distance $d_2$, which results in polygon 200B. It should be noted that the offset amount $d_2$ is such that edges $E_{2A}$ and $E_{3A}$ of polygon 200A effectively disappear in resized polygon 200B. Again, because edges $E_{2A}$ and $E_{3A}$ effectively disappear (or collapse) by the offset operation, such resizing event is referred to as an edge-collapse-event.

In order to generate the correct polygon resulting from a resize operation that generates an edge-collapse event, it is desirable to have implemented a technique that is capable of accurately detecting and responding to such an edge-collapse event. That is, it is generally desirable for a resizing method to accurately detect and respond to edge-collapse events in a simple polygon in order to generate a correct resized simple polygon. It should be noted that during an offset or inset operation, each vertex moves along the bisector of the angle defined by that vertex. Therefore, a given edge E collapses when the bisectors of the two vertices bounding such edge E meet.

Figure 3A:
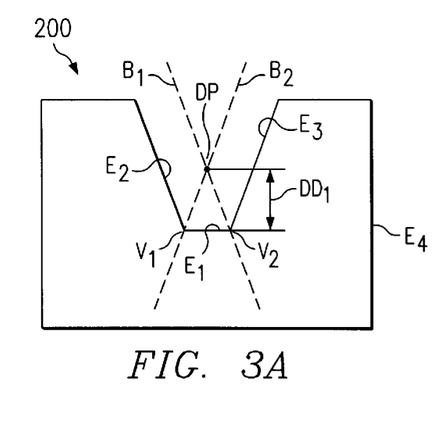
FIG. 3A shows an example of determining the point at which an edge $E_1$ of the simple polygon of FIG. 2A collapses in accordance with an embodiment of the present invention.
Figure 3B:
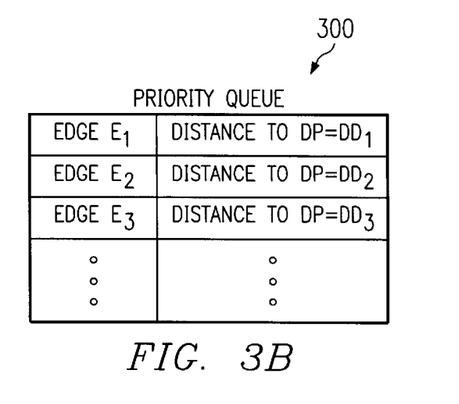
FIG. 3B shows an example priority queue in which the distance to the determined collapsing point for each edge of the polygon of FIG. 3A is stored in accordance with a preferred embodiment of the present invention.

A preferred embodiment detects such edge-collapse events by computing the distance at which every edge in the input polygon (i.e., the polygon being resized) collapses. For example, FIG. 3A shows an example of determining a destruction point "DP" for edge El of simple polygon 200 of FIG. 2A. As shown, edge $E_1$ comprises two vertices, $V_1$ and $V_2$. Bisector $B_1$ is determined, which bisects the vertex $V_2$ (i.e., bisects the angle formed between edges $E_1$ and $E_3$), and bisector $B_2$ is determined, which bisects the vertex $V_1$ (i.e., bisects the angle formed between edges $E_1$ and $E_2$). The destruction point "DP" for edge El is determined as the point at which bisectors $B_1$, and $B_2$ meet. The distance to destruction point DP (shown as distance $DD_1$, in this example) can be determined for edge El using relatively simple geometric techniques. Thus, for example, by determining whether a resize request, such as a request to offset polygon 200 by distance $d_1$, (as in the example of FIG. 2B), reaches (or exceeds) distance $DD_1$, an edge-collapse event for edge El can be detected.

As a further explanation of determining the distance to a destruction point for an edge of a polygon (e.g., distance $DD_1$ in the example of FIG. 3A), let edges $E_1$, $E_2$, and $E_3$ be three consecutive edges of an arbitrary simple polygon (such as edges $E_1$, $E_2$, and $E_3$ shown in example polygon 200 of FIG. 2A). Further, let $a_nx+b_ny+c_n=0$ be the line which passes through $E_n$ such that for any point $(x_i,y_i)$ which lies to the left of the edge $E_n$ $a_nx_i+b_ny_i+c_n<0$. Simple geometric arguments can be used to calculate the distance DD at which the edge $E_2$ collapses. Distance DD may be referred to as the destructive distance because it is the distance to the destruction point DP for a particular edge. For instance, assuming $a_1^2+b_i^2=1$, DD can be calculated by the formula below (wherein the vertical bars for each matrix indicate the matrix's determinant):

$$DD = \frac{\begin{vmatrix} a_1 & b_1 & c_1 \\ a_2 & b_2 & c_2 \\ a_3 & b_3 & c_3 \end{vmatrix}}{\begin{vmatrix} a_2 & b_2 \\ a_3 & b_3 \end{vmatrix} - \begin{vmatrix} a_1 & b_1 \\ a_3 & b_3 \end{vmatrix} + \begin{vmatrix} a_1 & b_1 \\ a_2 & b_2 \end{vmatrix}}$$

It should be recognized that some edges of a polygon may never collapse when an offset operation is performed, but may instead potentially collapse only while insetting the polygon. An example of such an edge that may potentially collapse only while insetting the polygon is edge $E_4$ of polygon 200 shown in FIG. 3A. In such a case in which an edge may potentially collapse only while insetting the polygon, the above formula for computing DD would return a negative value.

In a preferred embodiment, the corresponding computed destructive distance "DD" for each edge of a polygon is stored in a priority queue in order of increasing destructive distance. Techniques for implementing a priority queue are well known in the art, and therefore will not be described in great detail herein. As an example, once the destructive distance "DDI" (i.e., the distance to destruction point DP) is computed for edge $E_1$ (as shown in FIG. 3A), such destructive distance value "DDI" may be stored in priority queue 300 of FIG. 3B. Priority queue 300 preferably arranges the computed destructive distance values for the edges of polygon 200 in order of increasing destructive distance in order to optimize computing efficiency. For example, because destructive distance $DD_1$, for edge $E_1$ is prioritized at the head (or top) of queue 300, it is known that distance $DD_1$ is the smallest distance at which an offset can be performed on polygon 200 that would result in an edge-collapse event (as opposed to searching through the entire queue to determine the smallest destructive distance). Thus, if an offset of polygon 200 is requested that is less than $DD_1$, it is known that no edge-collapse events are encountered in performing such offset. That is, a requested offset amount may be compared against value DDI, and if it is determined that the requested offset amount is less than $DD_1$, it is determined that an edge-collapse event is not encountered for edge El; and, once it is determined that the requested offset amount is less than $DD_1$, no further comparison needs to be made with the other edges (e.g., edges $E_2$, $E_3$, etc.) of polygon 200 because queue 300 is preferably prioritized such that El having the smallest destructive distance is arranged at its head, thus minimizing computation time associated with detecting an edge-collapse event while enabling edge-collapse events to be correctly detected. It should be recognized that because the priority queue of a preferred embodiment stores the destructive distance for each edge of a polygon, it has storage space of O(n).

Figure 4A:
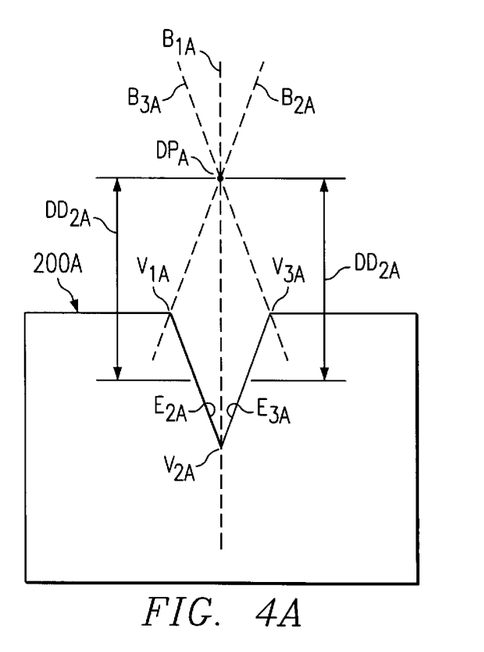
FIG. 4A shows an example of determining the point at which edges of the offset polygon if FIG. 2B collapse in accordance with an embodiment of the present invention.

As another example, FIG. 4A shows an example of determining a destruction point "DPA" for edges $E_{2A}$ and $E_{3A}$ of simple polygon 200A of FIG. 2B. As shown, edge $E_{2A}$ comprises two vertices, $V_{1A}$ and $V_{2A}$, and edge $E_{3A}$ comprises two vertices, $V_{2A}$ and $V_{3A}$. Bisector $B_{1A}$ is determined, which bisects the vertex $V_{2A}$ (i.e., bisects the angle formed between edges $E_{2A}$ and $E_{3A}$). Bisector $B_{2A}$ is determined, which bisects the vertex $V_{1A}$, and bisector $B_{3A}$ is determined, which bisects the vertex $V_{3A}$. The destruction point "DPA" for edge $E_{2A}$ is determined as the point at which bisectors $B_{1A}$ and $B_{2A}$ meet. The destruction point for edge $E_{3A}$ is determined as the point at which bisectors $B_{1A}$ and $B_{3A}$ meet. In the example of FIG. 4A, the destruction point $DP_A$ is common to both edges $E_{2A}$ and $E_{3A}$. That is, edges $E_{2A}$ and $E_{3A}$ collapse at a common point "$DP_A$." As described above, the distance to destruction point $DP_A$ (shown as distance "$DD_{2A}$" in this example) can be determined for edges $E_{2A}$ and $E_{3A}$ using relatively simple geometric techniques. Thus, by determining whether a resize request, such as a request to offset polygon 200A by distance $d_2$ (as in the example of FIG. 2C), reaches (or exceeds) distance $DD_{2A}$, an edge-collapse event for edges $E_{2A}$ and $E_{3A}$ can be detected.

Figure 4B:
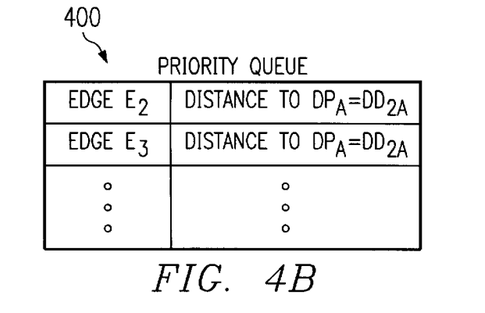
FIG. 4B shows an example priority queue in which the distance to the determined collapsing point for each edge of the polygon of FIG. 4A is stored in accordance with a preferred embodiment of the present invention.

As described above, once the destructive distance "$DD_{2A}$" (i.e., the distance to destruction point $DP_A$) is computed for edges $E_{2A}$ and $E_{3A}$ (as shown in FIG. 4A), such destructive distance value "$DD_{2A}$" may be stored in priority queue 400 of FIG. 4B. Priority queue 400 preferably arranges the computed destructive distance values for the edges of polygon 200A in order of increasing destructive distance in order to optimize computing efficiency. For example, because destructive distance $DD_{2A}$ for edges $E_{2A}$ and $E_{3A}$ is prioritized at the head (or top) of queue 400, it is known that distance $DD_{2A}$ is the smallest distance at which an offset can be performed on polygon 200A that would result in an edge-collapse event.

In a preferred embodiment, the edge-collapse events are handled one by one as the polygon is resized (i.e., is inset or offset). The edge which has the lowest destructive distance collapses first. When an edge-collapses, its two neighbors, become adjacent. Therefore, their destructive distances have to be recomputed. For example, once the edge-collapse event occurs for edge $E_1$ of polygon 200, as in the example of offsetting polygon 200 by amount $d_1$ shown in FIG. 2B, edges $E_2$ and $E_3$ become adjacent (resulting in edges $E_2$ and $E_3$) and their respective destructive distances are recomputed. Once recomputed, the priority queue in which the destructive distances for edges of the polygon is preferably updated (i.e., re-prioritized) to reflect the recomputed destructive distances $DD_{2A}$ of edges $E_{2A}$ and $E_{3A}$. The above process may be repeated until no more edges can be collapsed or until the requested offset distance is reached.

Assuming "d" is the requested (e.g., user-specified) offset distance for a polygon, the algorithm implemented for a preferred embodiment may be written in pseudo-code as:

---
Compute the destructive distance of all edges;
Set all negative destructive distances to ∞; {These edges never collapse.}
Insert edges into a priority queue P ordered by their destructive distances;
Repeat
    Pop edge e from top of P;
    if destructive distance of e > d then
        break;
    end if
    Locate neighbors of e:$e_1$ and $e_2$ in P;
    Recalculate destructive distances of $e_1$ and $e_2$ based on their new neighbors;
    Reposition $e_1$ and $e_2$ in P;
until (true) {All edges left in P will not collapse.}
for all e∈ P do
    Offset e by d;
end for
Link up edges to form the offsetted polygon.

---

The above algorithm is further described below in conjunction with the offset procedure described in FIG. 7B. Deleting an edge from the priority queue P, as well as inserting an edge in priority queue P, runs in O(log n). Accordingly, this technique for accurately responding to encountered edge-collapse events operates in O(n log n) time.

A third type of resizing event that may be encountered when resizing a simple polygon is a polygon-split event.

Figure 5A:
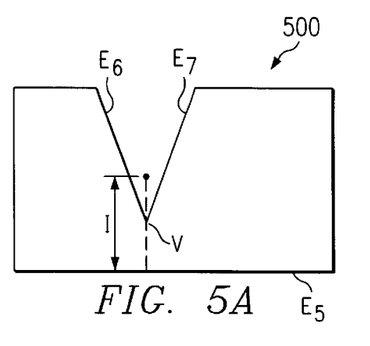
FIG. 5A shows an example simple polygon.
Figures 5B, 7A:
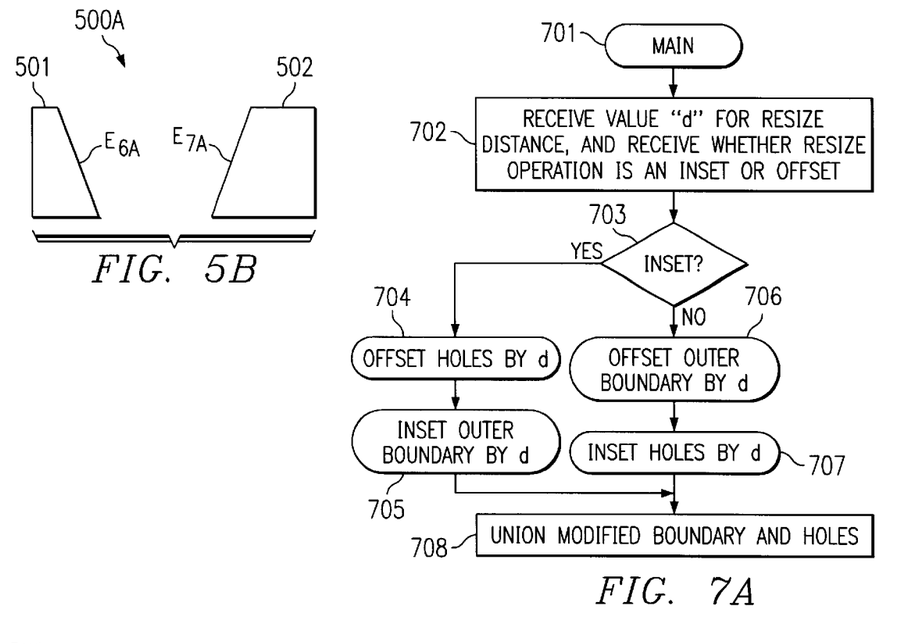
FIG. 5B shows a resulting split polygon that results from insetting the polygon of FIG. 5A by an inset distance I.
FIGS. 7A–7C show an example operational flow diagram of a preferred embodiment of the present invention.
Figure 6:
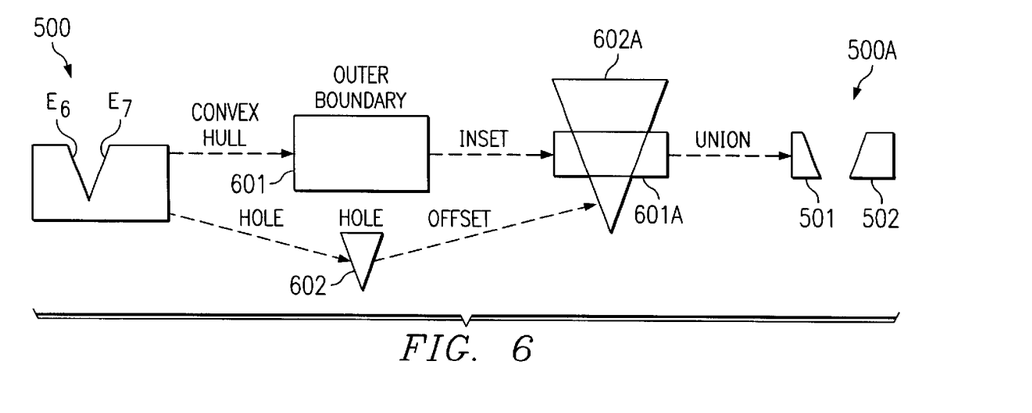
FIG. 6 shown a example of performing an inset of the polygon of FIG. 5A in a manner that accounts for the encountered polygon-split event in accordance with a preferred embodiment of the present invention.

Such polygon-split event and a preferred method for accurately responding to such events are now described in conjunction with FIGS. 5A–5B and 6. FIG. 5A shows an example simple polygon 500 that includes edge $E_5$, as well as edges E6 and E7 having vertex "v." Such polygon 500 may be utilized in an application, such as a MEMS layout application for example, and it may be desired to resize such polygon 500. For example, a user of the application may desire to decrease the size of polygon 500 by a particular inset amount. For example, original polygon 500 may be resized by an inset amount "I", which results in splitting of polygon 500 into two separate parts. More specifically, in such resizing operation, all edges of polygon 500 are inset (i.e., moved inward) by a distance I, which results in the split polygon 500A of FIG. 5B. It should be noted that the inset amount I is such that vertex v splits edge $E_5$ in a manner that results in the resulting split polygon 500A of FIG. 5B, which comprises two separate parts 501 and 502 (which may be referred to as separate polygons 501 and 502). After the insetting operation, edge $E_6$ of original polygon 500 becomes edge $E_{6A}$ of part 501, and edge $E_7$ of original polygon 500 becomes edge $E_{7A}$ of part 502. Because such insetting operation results in splitting of polygon 500 into two or more separate parts (i.e., into two or more separate polygons), such resizing event is referred to as a polygon-split event.

In order to generate the correct polygon resulting from a resize operation that generates a polygon-split event, it is desirable to have implemented a technique that is capable of accurately detecting and responding to such a polygon-split event. That is, it is generally desirable for a resizing method to accurately detect and respond to polygon-split events in a simple polygon in order to generate a correct resized simple polygon.

While the above-described edge-collapse and self-intersection events may be encountered during either a polygon offset or inset operation, a polygon-split event may be encountered during an inset operation but not during an offset operation. Further, it should be understood that polygon-split events can only occur if the polygon contains reflex vertices, i.e. polygon-split events are not encountered when a convex polygon is inset. Only a reflex vertex (for example, vertex "v" in the example polygon 500 of FIG. 5A) can collide with an edge during an inset operation in a manner that results in splitting of the polygon.

As shown in conjunction with FIG. 6, in a preferred embodiment, a polygon is decomposed into its convex hull and hole(s). For instance, in the example of FIG. 6, original polygon 500 is decomposed into its convex hull 601 (which may be referred to as its "outer boundary") and its hole(s) 602 (such holes being formed by reflex vertices that are present in the polygon). The convex hull of a polygon comprising n edges can be computed in O(n) using techniques known in the art. For example, Melkman's algorithm may be utilized in determining the convex hull of a polygon in accordance with a preferred embodiment. Melkman's algorithm is described further in Melkman, A. A., "On-line construction of the convex hull of a simple polyline," Information Processing Letters 25, 1, pp. 11-12, 1987, the disclosure of which is hereby incorporated herein by reference. Melkman's algorithm uses 0(n) storage space.

Once the convex hull is determined, the edges of such convex hull may be compared against the original polygon in order to determine the hole(s). For instance, the edges of convex hull 601 may be compared against the original polygon 500 in the example of FIG. 6. All adjacent edges which are present in the original polygon but not in the convex hull form a hole. For instance, edges $E_6$ and $E_7$ of example polygon 500 are present in original polygon 500, but are not present in convex hull 601, and therefore such edges $E_6$ and $E_7$ form a hole component of the decomposition of polygon 500. Therefore, the decomposition of a polygon into its convex hull and holes can be performed in O(n).

After the decomposition, the convex hull is inset by the requested (e.g., user-specified) inset amount. For example, convex hull 601 is inset by the requested inset amount (e.g., inset amount "I" of FIG. 5A), which results in inset convex hull 601A shown in FIG. 6. It should be understood that insetting convex hull 601 will cause any polygon-split events to be encountered because convex hull 601 does not contain any reflex vertices. Accordingly, the insetting process for such convex hull 601 is preferably performed using a slightly modified version of the algorithm described above for edge-collapse events. The only difference is that edges are sorted by the negative of their destructive distances and all positive destructive distances are set to negative infinity ($-\infty$). In this sense, infinity is intended to be a sufficiently large number to ensure that the edges will never reach the top of the priority queue P (because those edges will not possibly disappear during this resizing operation).

The hole component(s) of the decomposition (e.g., hole 602 of FIG. 6) are offset by the requested distance. For example, hole 602 is offset by the requested amount (e.g., amount "I" of FIG. 5A), which results in offset hole 602A shown in FIG. 6. The inset convex hull 601A and the offset hole(s) 602A are merged together with a union operation to give the final inset polygon 500A, which is split into separate parts 501 and 502. Since the polygon offset and the polygon union operations run in O(n log n), the entire inset operation also runs in O(n log n).

A preferred embodiment is capable of performing resize operations on a polygon that includes hole(s) therein. For example, in a preferred embodiment, when performing an offset of a polygon that includes holes, the outer contour of the polygon is offset and the holes are inset. The resultant polygons (i.e., the resulting offset outer contour and the resulting inset holes) are then unioned together to get the final polygon. Similarly, to inset a polygon that includes holes, the outer contour of the polygon is inset, while the holes are offset; and the resultant polygons are unioned together.

Figure 7B:
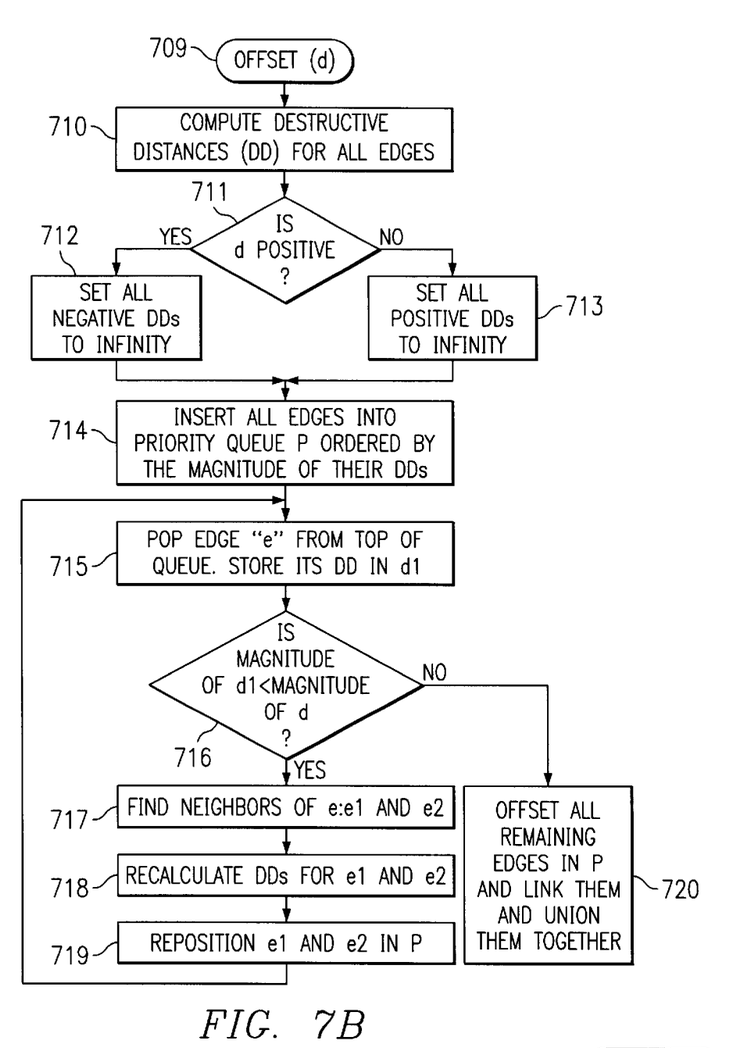
Figure 7C:
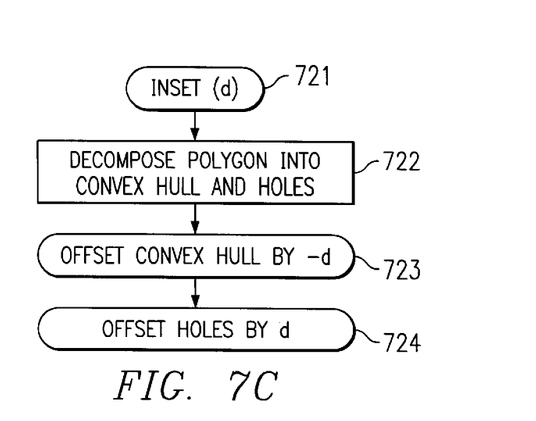

Turning now to FIGS. 7A–7C, an example operational flow diagram of a preferred embodiment of the present invention is shown that is operable for resizing a simple polygon accurately (e.g., accounting for any of the above-described resizing events that may be encountered) with runtime of O(n log n). The operational flow illustrated in FIGS. 7A–7C may represent the operational flow of computer-executable code for performing resizing of polygons in a computer-executable application, such as a MEMS layout application, for example. When a resizing operation is desired, the operational flow starts at the main procedure 701. At operational block 702, the resize value "d" for a polygon, as well as an indication of whether the resize operation is an inset or an offset operation, is received. Such resize value d and indication of the type of resize operation desired (i.e., inset or offset) may, for example, be received as user input from an input device (e.g., keyboard, mouse, etc.) coupled to the computer on which the polygon resize procedure is executing. Of course, in certain implementations, a positive d value may indicate an offset and a negative d value may indicate an inset.

At operational block 703, it is determined whether the resize request is for an inset of the polygon. If it is determined that an inset of the polygon is requested, then execution advances to block 704 at which the holes, if any, of the polygon being resized are offset by distance d. In order to perform such offset operation on the holes, the offset procedure of FIG. 7B described below is preferably called.

Thereafter, at block 705, the outer boundary (or "outer contour") of the polygon is inset by d. In order to perform such inset operation on the polygon's outer boundary, the inset procedure of FIG. 7C described below is preferably called. Execution advances from block 705 to block 708, whereat the modified (i.e., offset and inset) outer boundary and holes (if any) of the polygon are unioned together to generate the resulting resized polygon.

If it is determined at block 703 that an inset of the polygon is not requested, then execution advances from block 703 to block 706 at which the polygon's outer boundary is offset by d. In order to perform such offset operation on the outer boundary, the offset procedure of FIG. 7B described below is preferably called. Thereafter, at block 707, the holes, if any, of the polygon being resized are inset by d. In order to perform such inset operation on the polygon's holes, the inset procedure of FIG. 7C described below is preferably called. Execution then advances from block 707 to block 708, whereat the modified (i.e., offset and inset) outer boundary and holes (if any) of the polygon are unioned together to generate the resulting resized polygon.

Turning to FIG. 7B, an example flow diagram for an offset procedure according to a preferred embodiment of the present invention is shown. The offset procedure starts in operational block 709 in which it receives the value d, which may be either positive or negative. As described further below, the inset procedure of a preferred embodiment (of FIG. 7C) calls this offset procedure (of FIG. 7B) and may pass it a negative d value.

In block 710, the destructive distances ("DD") for all edges of the polygon being resized are computed. As described above, such destructive distances may be computed using relatively simple geometric techniques. In block 711, it is determined whether the received d is positive. If it is determined that the received d is positive, then execution advances to operational block 712 whereat all negative DDs are set to "infinity." By "infinity" in this sense, I mean that the negative DDs are set to a sufficiently large value such that it is ensured that they will not be prioritized at the top of priority queue P in block 714. If it is determined at block 711 that d is not positive (i.e., is negative), then execution advances to operational block 713 whereat all positive DDs are set to "infinity." Again, by "infinity" in this sense, I mean that the positive DDs are set to a sufficiently large value such that it is ensured that they will not be prioritized at the top of priority queue P in block 714.

At operational block 714, all edges of the polygon being resized are inserted into priority queue P ordered by the magnitude of their respective DDs. At operational block 715, edge "e" prioritized at the top of queue P is retrieved and its respective DD is stored in variable "d1". At operational block 716, a determination is made as to whether the magnitude of d1 is less than the magnitude of the received resize value d. As described above, if the magnitude of d is greater than "d1" (i.e., the value DD for edge "e" prioritized at the top of queue P), it is determined that an edge-collapse event is encountered for such edge "e".

Accordingly, if it is determined at block 716 that the magnitude of "d1" is less than the magnitude of d, then execution advances to block 717 whereat the neighboring edges e1 and e2 of edge e are determined. In block 718, the DDs for the neighboring edges e1 and e2 are recalculated. Thereafter, in block 719, the edges e1 and e2 are re-prioritized in priority queue P based on their newly calculated DDs. Execution then returns to block 715, and the new edge "e" that is now atop the priority queue P is retrieved and its DD value is stored in variable "d1 ".

Once it is determined at block 716 that the magnitude of "d1" (i.e., the magnitude of DD for the top-priority edge of priority queue P) is not less than the magnitude of d, then execution advances to block 720. At block 720, all of the edges remaining in priority queue P (i.e., the edges that have not been collapsed) are linked and then unioned together. More specifically, the points of intersection of all adjacent offsetted edges are calculated and the edges are linked at these points, and the edges are then unioned together.

Turning now to FIG. 7C, an example flow diagram for an inset procedure according to a preferred embodiment of the present invention is shown. The inset procedure starts in operational block 721 in which it receives the value d. As described further below, the inset procedure of FIG. 7C calls the offset procedure of FIG. 7B. In block 722, the polygon being resized is decomposed into its convex hull and hole(s). As described above, techniques are known for decomposing a polygon into its convex hull and hole(s), such as Melkman's algorithm, for example. In block 723, the convex hull is offset by -d. In other words, the convex hull is inset by d, as described in conjunction with FIG. 6 above. To perform the offset of the convex hull by -d, the offset procedure described in conjunction with FIG. 7B above is called (in which case a negative d value is passed to the offset procedure). In operational block 724, the hole(s) are offset by d. Thus, the offset procedure described in conjunction with FIG. 7B above is called to perform an offset of the hole(s) (in which case a positive d value is passed to the offset procedure).

In view of the above, a preferred embodiment provides a robust solution that is capable of performing resizing operations on a simple polygon in a manner that consitently accounts for any resizing events that may be encountered (i.e., self-intersection, edge-collapse, and polygon-split events) in a computationally inexpensive manner. Further, the solution described above is relatively straight-forward and easy to implement. However, two particular issues that may arise when implementing a preferred embodiment are discussed below in conjunction with FIGS. 8A–8B and 9A–9B.

Figure 8A:
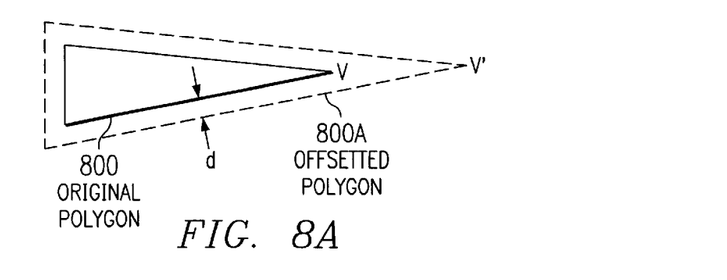
FIGS. 8A–8B show a technique for converting a sharp corner of a polygon to a beveled corner in accordance with an embodiment of the present invention.
Figure 8B:
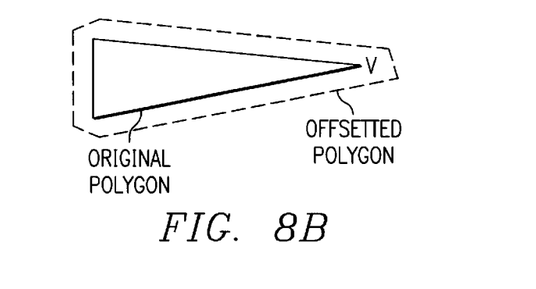

First, when a sharp corner is offset or inset, the vertex of a polygon may move a large distance. This is illustrated in FIG. 8A. More specifically, when original polygon 800 having vertex v is offset by distance d to result in offset polygon 800A having vertex v', such vertex v is offset a large distance to achieve vertex v'. In some applications this is desirable. Embodiments of the present invention may be used for mask generation in the design of Micro-Electro Mechanical Systems (MEMS) and capped off sharp corners with bevel edges as shown in FIG. 8B. Note that if the two edges meeting at a sharp corner are represented by the lines $a_1x+b_1y+c_1=0$ and $a_2x+b_2y+c_2=0$ and $a_1^2+b_1^2+c_1^2=a_2^2+b_2^2+c_2^2$, the line representing the bevel edge is simply the average of the two edges:

$$\frac{a_1+a_2}{2}x+\frac{b_1+b_2}{2}y+\frac{c_1+c_2}{2}=0.$$

Accordingly, this technique may be utilized to enable sharp corners of a polygon to be converted into bevel edges.

Figure 9A:
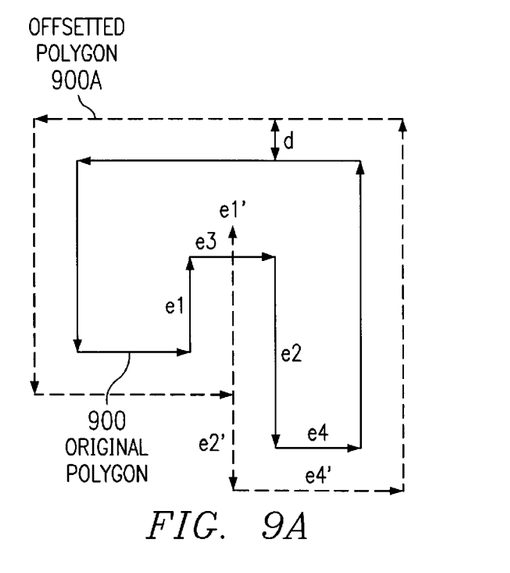
FIGS. 9A–9B show a technique for properly accounting for two non-adjacent parallel edges of a polygon becoming adjacent as a result of a resize operation in accordance with an embodiment of the present invention.
Figure 9B:
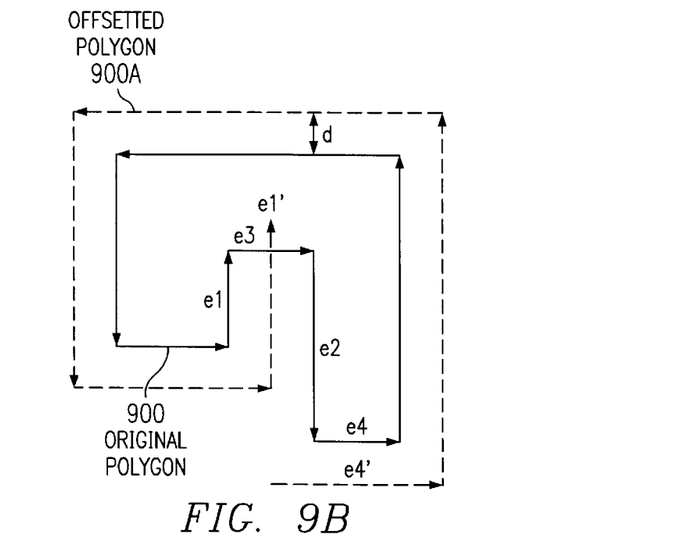

As another issue, during an offset or inset operation, two non-adjacent parallel edges may become adjacent because the edge in between them collapses. In that case the destructive distance of both of these edges becomes zero. If the longer of these two edges is removed first, the shorter edge left behind would not link with its new neighbor (after the longer edge has been removed). This is illustrated in FIGS. 9A–9B. More specifically, in FIG. 9A, original polygon 900 is offset a distance d to result in offset polygon 900A. During the offset operation, parallel edges $e_1$ and $e_2$ of original polygon 900 become adjacent and their destructive distances become 0 in offset polygon 900A when $e_3$ collapses. Edges $e_1$ and $e_2$ of original polygon 900 get offset to edges $e'_1$, and $e'_2$ respectively of offset polygon 900A. It should be recognized that if edge $e'_2$ is removed first, as shown in the example of FIG. 9B, then $e'_1$ cannot be linked to its new neighbor $e'_4$. Therefore in this particular case, the shorter edge (i.e., edge $e'_1$ in this example) is preferably removed first in order to generate the correct offset polygon 900A.

While a preferred embodiment described above in conjunction with FIGS. 7A–7C provides a robust solution that is capable of performing resizing operations on a simple polygon in a manner that accurately accounts for any resizing events that may be encountered (i.e., self-intersection, edge-collapse, and polygon-split events), in alternative embodiments a solution may be implemented that accounts for only certain resizing events in the manner described above. In such alternative embodiments, certain resizing events may be handled in a manner such as those proposed in the prior art or may not be handled at all.

It should also be understood that while various examples described above provide for resizing (e.g., offsetting or insetting) an entire simple polygon, embodiments of the present invention may be implemented to allow for resizing of only a selected portion of a simple polygon. For example, a user of an application may, in certain embodiments, be able to select a portion of a simple polygon and have resize only the selected portion. Thus, certain edges and vertices of a polygon may remain stationary (i.e., not offset or inset) while a resizing operation is applied to other edges and vertices of such polygon. Again, in performing such resizing of a portion of a simple polygon, embodiments of the present invention may be implemented to accurately account for any resizing event that may be encountered (i.e., self-intersection, edge-collapse, and polygon-split events).

To enable selected portion(s) of a simple polygon to remain stationary during a resize operation, the above-described algorithm (of FIGS. 7A–7C) may be modified slightly. More specifically, in the presence of stationary edges, the calculation of destructive distances for edge-collapse events should be modified. There are three situations that can arise for a vertex: (1) both neighboring edges are non-stationary (i.e., both neighboring edges of the vertex are being offset or inset), (2) one neighboring edge is non-stationary, or (3) both neighboring edges are stationary.

When both neighboring edges of a vertex are non-stationary, the vertex moves along its perpendicular bisector during the offset/inset operation (in the same manner as described in the examples described above - see FIGS. 3A and 4A, as examples). When both neighboring edges of a vertex are stationary, then the vertex does not move during the offset or inset operation.

Figure 10A:
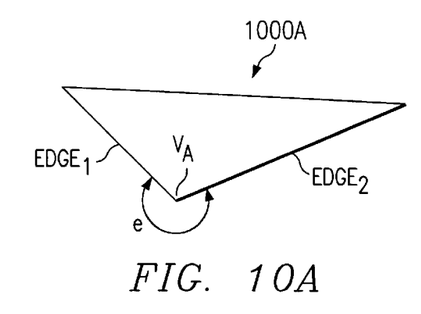
FIGS. 10A–10B show example simple polygons to illustrate an exterior angle "e" of a vertex and interior angle "i" of a vertex, respectively.

When one neighboring edge of a vertex is non-stationary, the vertex moves along the stationary edge. If a portion of the polygon is being offset: (1) if the angle defined at the vertex is reflex, the vertex moves into the stationary edge (thereby effectively shortening the length of such stationary edge), and (2) if the angle defined at the vertex is convex, the vertex moves away from the stationary edge in a direction perpendicular to its normal (thereby effectively lengthening the stationary edge). It should be noted that the above two cases can be expressed succinctly by saying that the vertex moves in a direction away from the stationary edge at a speed of $-1/\sin(e)$ for an offset and at a speed of $1/\sin(e)$ for an inset operation, wherein "e" is the exterior angle of the vertex. To illustrate this point further, example simple polygon 1000A is shown in FIG. 10A, which comprises vertex $V_A$ that is bounded by edges $Edge_1$ and $Edge_2$. The exterior angle "e" of vertex $V_A$ is shown in the example of FIG. 10A. Assuming that $Edge_1$ is stationary and $Edge_2$ is non-stationary for a resize operation, vertex VA moves in a direction away from $Edge_1$ at a speed of $-1/\sin(e)$ for an offset operation and at a speed of $1/\sin(e)$ for an inset operation.

Figure 10B:
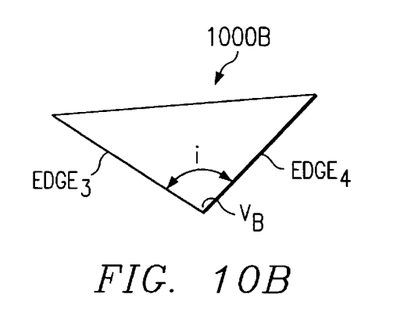

Based on the above observations, the destructive distance of each edge of a polygon (a portion of which is being resized) may be calculated. In view of the above, the direction, as well as the speed, in which a particular vertex moves is known. When one neighboring edge of a vertex is non-stationary, the speed and direction may be computed in the manner described above. When both neighboring edges of a vertex are stationary, the vertex does not move (i.e., speed0). When both neighboring edges of a vertex are non-stationary, the vertex moves in a direction of the angle bisector outward from the polygon. The speed of the vertex movement may be succinctly expressed as $1/\sin(i/2)$ for an offset operation, and may be expressed as $-1/\sin(i/2)$ for an inset operation, where "i" is the interior angle at that vertex. To illustrate this point further, example simple polygon 1000B is shown in FIG. 10B, which comprises vertex $V_B$ that is bounded by edges $Edge_3$ and $Edge_4$. The interior angle "i" of vertex $V_B$ is shown in the example of FIG. 10B. Assuming that both $Edge_3$ and $Edge_4$ are non-stationary for a resize operation, vertex $V_B$ moves in a direction of the bisector of angle "i" outward from polygon 1000B at a speed of $1/\sin(i/2)$ for an offset operation and at a speed of $-1/\sin(i/2)$ for an inset operation.

It should be understood that stationary edges may also collapse. Even though an edge is stationary, it vertices may move. Knowing the direction and speed of all vertices, the point at which two vertices bounding an edge will intersect (resulting in an edge-collapse event) can be calculated. In view of the above, embodiments of the present invention may be implemented to allow for only a portion of a simple polygon to be resized and may be capable of properly detecting and responding to edge-collapse events encountered during such resizing. Detecting and responding to other types of resizing events (e.g., self-intersection and polygon-split events) may be handled in the same manner as that described above in conjunction with FIGS. 1A–1C and 5A–6. Accordingly, in certain implementations a user of an application may selectively perform a resize operation on only a portion of a simple polygon, rather than resizing the entire simple polygon.

When implemented via computer-executable instructions, various elements of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 11:
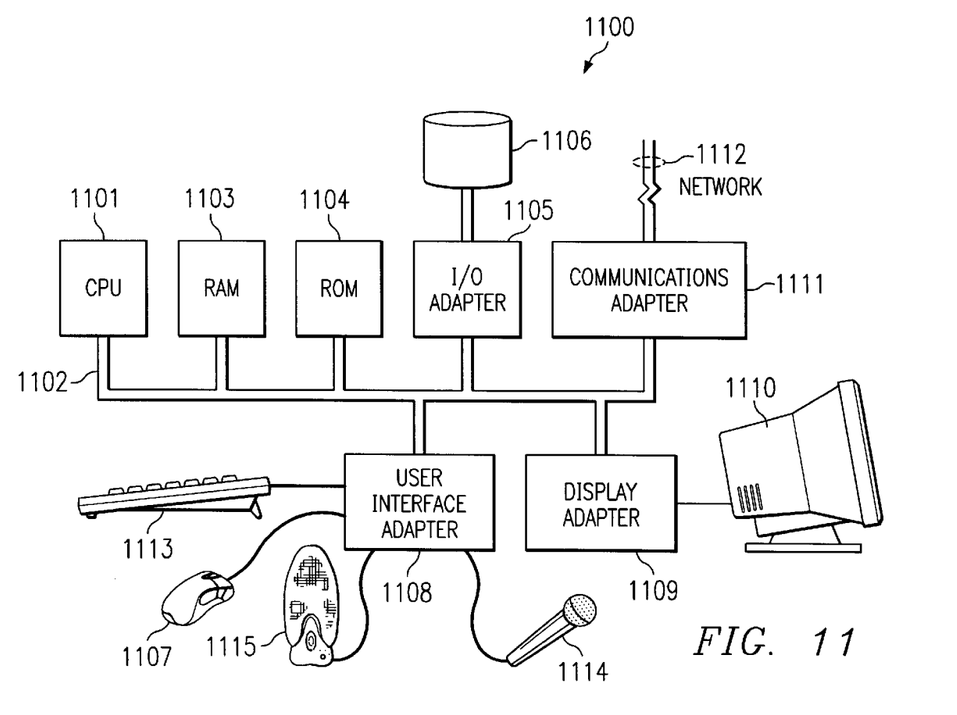
FIG. 11 shows an example computer system on which embodiments of the present invention may be implemented.

FIG. 11 illustrates an example computer system 1100 adapted according to embodiments of the present invention. Central processing unit (CPU) 1101 is coupled to system bus 1102. CPU 1101 may be any general purpose CPU. Suitable processors include without limitation INTEL's PENTIUM® 4 processor, for example. However, the present invention is not restricted by the architecture of CPU 1101 as long as CPU 1101 supports the inventive operations as described herein. CPU 1101 may execute the various logical instructions according to embodiments of the present invention. For example, CPU 1101 may execute machine-level instructions according to the exemplary operational flows described above in conjunction with FIGS. 7A–7C.

Computer system 1100 also preferably includes random access memory (RAM) 1103, which may be SRAM, DRAM, SDRAM, or the like. Computer system 1100 may utilize RAM 1103 to store the various data structures used in representing and/or resizing polygons, such as storing priority queues (e.g., priority queues 300 and 400 of FIGS. 3B and 4B, respectively). Computer system 1100 preferably includes read-only memory (ROM) 1104 which may be PROM, EPROM, EEPROM, or the like. RAM 1103 and ROM 1104 hold user and system data and programs as is well known in the art.

Computer system 1100 also preferably includes input/output (I/O) adapter 1105, communications adapter 1111, user interface adapter 1108, and display adapter 1109. I/O adapter 1105 and/or user interface adapter 1108 may, in certain embodiments, enable a user to interact with computer system 1100 in order to input information for resizing polygons in a desired manner, such as inputting a desired offset or inset amount to be applied to a polygon.

I/O adapter 1105 preferably connects to storage device(s) 1106, such as one or more of hard drive, compact disc (CD) drive, floppy disk drive, tape drive, etc. to computer system 1100. The storage devices may be utilized when RAM 1103 is insufficient for the memory requirements associated with representing and/or resizing of polygons. Communications adapter 1111 is preferably adapted to couple computer system 1100 to network 1112, which may be one or more of telephony network (e.g., public or private switched telephony network), local (LAN) and/or wide-area (WAN) network, wireless network, and/or the Internet. User interface adapter 1108 couples user input devices, such as keyboard 1113, pointing device 1107, and microphone 1114 and/or output devices, such as speaker(s) 1115 to computer system 100. Display adapter 1109 is driven by CPU 1101 to control the display on display device 1110.

It shall be appreciated that the present invention is not limited to the architecture of system 1100. For example, any suitable processor-based device may be utilized including without limitation personal data assistants (PDAs), computer game consoles, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

It should be recognized that embodiments of the present invention provide for computational time of O(n log n) in worst case scenario. As described above, embodiments of the present invention may respond to a self-intersection event encountered during a resize operation in O(n log n) time. Further, embodiments of the present invention may respond to an edge-collapse event in O(n log n) time. Additionally, embodiments of the present invention may respond to a polygon-split event in O(n log n) time. Thus, in a worst case scenario, in which all three of such resizing events are encountered, the computational time is O(3(n log n), but as is well known, in order analysis, the constant "3" may be disregarded such that the computational time of embodiments of the present invention are said to run in O(n log n) time. Further, embodiments of the present invention provide a robust solution for correctly generating a resized simple polygon without requiring computation of the polygon's straight skeleton. Also, a preferred embodiment utilizes O(n) storage space.

It should also be understood that embodiments of the present invention may be utilized in an application that uses self-intersecting polygons because such self-intersecting polygons may be decomposed into simple polygons, and embodiments of the present invention may be utilized to resize the simple polygons in order to properly resize the self-intersecting polygon that they represent.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

receiving a resize amount for which at least a portion of a simple polygon is to be resized, the simple polygon comprising n vertices the resize amount comprising an amount that causes at least a self-intersection event to be encountered; and generating an accurate result for resizing said at least a portion of said simple polygon by said resize amount, said generating comprising:

resizing said at least a portion of said polygon by said resize amount; and performing a union on edges of the resulting resized simple polygon;

wherein said generating step generates an accurate result for said simple polygon for any resize amount received, wherein said generating an accurate result executes in O(n log n) time or less.

2. The method of claim 1 wherein said simple polygon is a convex polygon.

3. The method of claim 1 wherein said simple polygon is a non-convex polygon.

4. The method of claim 1 wherein said simple polygon includes at least one hole.

5. The method of claim 1 wherein said resize amount comprises an amount that further causes at least a polygon-split event to be encountered, and wherein said generating an accurate result further comprises:

decomposing said simple polygon into a convex hull and at least one hole;

insetting at least a portion of said convex hull by said resize amount;

offsetting at least a portion of said at least one hole by said resize amount; and unioning the resulting inset convex hull and offset at least one hole.

6. The method of claim 1 wherein said generating an accurate result further comprises:

detecting an edge-collapse event.

7. The method of claim 6 wherein said resizing at least a portion of said simple polygon comprises resizing the entire simple polygon by said resize amount, said detecting an edge-collapse event including:

computing the distance to destruction for all edges of the simple polygon; and determining whether the received resize amount is at least as large as the computed destructive distance for any one of the edges.

8. The method of claim 7 further comprising:

storing the computed distance to destruction for said edges in a priority queue that is prioritized by said distance to destruction.

9. The method of claim 6 wherein said resizing at least a portion of said simple polygon comprises resizing only a portion of said simple polygon by said resize amount, said detecting an edge-collapse event comprising:

determining the speed and direction at which each vertex of said simple polygon is to be moved during the resizing of said portion of said simple polygon.

10. The method of claim 9, wherein said determining step comprises:

if both neighboring edges of a first vertex of said simple polygon are stationary, determining that the speed and distance of movement of such first vertex is zero.

11. The method of claim 9 wherein said determining step comprises:

if both neighboring edges of a first vertex of said simple polygon are non-stationary, determining that such first vertex moves outward at a speed of 1/sin(i/2) for an offset operation and at a speed of −1/sin(i/2) for an inset operation, where "i" is the first vertex's interior angle.

12. The method of claim 9 wherein said determining step comprises:

if only one neighboring edge of a first vertex of said simple polygon is non-stationary, determining that such first vertex moves away from its stationary neighboring edge at a speed of −1/sin(e) for an offset operation and at a speed of 1/sin(e) for an inset operation, where "e" is the first vertex's exterior angle.

13. The method of claim 9 wherein said detecting step further comprises:

for each edge of said simple polygon, computing the point at which the vertices bounding such edge will intersect.

14. The method of claim 1 wherein said resizing of at least a portion of said simple polygon comprises offsetting said at least a portion of said simple polygon by said resize amount.

15. The method of claim 1 wherein said resizing of at least a portion of said simple polygon comprises insetting said at least a portion of said simple polygon by said resize amount.

16. The method of claim 1 wherein said resizing of at least a portion of said simple polygon comprises resizing the entire simple polygon by said resize amount.

17. A method for resizing a simple polygon, said method comprising:

receiving a resize amount for which at least a portion of a simple polygon having any number n vertices is to be resized; and computing an accurate result for resizing said at least a portion of said simple polygon by said received resize amount for any resize amount received, wherein said computing executes in O(n log n) time or less.

18. The method of claim 17 wherein said computing step does not require computation of a straight skeleton for said simple polygon.

19. The method of claim 17 wherein said resize amount received comprises an amount that causes at least one resize event to be encountered when resizing said at least a portion of said simple polygon.

20. The method of claim 19 wherein said at least one resize event comprises at least one type of event selected from the group consisting of:

self-intersection event, edge-collapse event, and polygon-split event.

21. The method of claim 17 wherein said simple polygon is a convex polygon.

22. The method of claim 17 wherein said simple polygon is a non-convex polygon.

23. The method of claim 17 wherein said simple polygon includes at least one hole.

24. The method of claim 17 wherein said resize amount comprises an amount that causes at least a self-intersection event to be encountered, and wherein said computing an accurate result comprises:

resizing said at least a portion of said simple polygon by said resize amount; and performing a union on the edges of the resulting resized simple polygon.

25. The method of claim 17 wherein said resize amount comprises an amount that causes at least a polygon-split event to be encountered, and wherein said computing an accurate result comprises:

decomposing said simple polygon into a convex hull and at least one hole;

insetting at least a portion of said convex hull by said resize amount;

offsetting at least a portion of said at least one hole by said resize amount; and unioning the resulting inset convex hull and offset at least one hole.

26. The method of claim 17 wherein said computing an accurate result further comprises:

detecting an edge-collapse event.

27. The method of claim 26 wherein said resizing at least a portion of said simple polygon comprises resizing the entire simple polygon by said resize amount, said detecting an edge-collapse event including:

computing the distance to destruction for all edges of the simple polygon; and determining whether the received resize amount is at least as large as the computed destructive distance for any one of the edges.

28. The method of claim 27 further comprising:

storing the computed distance to destruction for said edges in a priority queue that is prioritized by said distance to destruction.

29. The method of claim 26 wherein said resizing at least a portion of said simple polygon comprises resizing only a portion of said simple polygon by said resize amount, said detecting an edge-collapse event comprising:

determining the speed and direction at which each vertex of said simple polygon is to be moved during the resizing of said portion of said simple polygon.

30. The method of claim 29 wherein said determining step comprises:

if both neighboring edges of a first vertex of said simple polygon are stationary, determining that the speed and distance of movement of such first vertex is zero.

31. The method of claim 29 wherein said determining step comprises:

if both neighboring edges of a first vertex of said simple polygon are non-stationary, determining that such first vertex moves outward at a speed of 1/sin(i/2) for an offset operation and at a speed of 1/sin(i/2) for an inset operation, where "i" is the first vertex's interior angle.

32. The method of claim 29 wherein said determining step comprises:

if only one neighboring edge of a first vertex of said simple polygon is non-stationary, determining that such first vertex moves away from its stationary neighboring edge at a speed of −1/sin(e) for an offset operation and at a speed of 1/sin(e) for an inset operation, where "e" is the first vertex's exterior angle.

33. The method of claim 29 wherein said detecting step further comprises:

for each edge of said simple polygon, computing the point at which the vertices bounding such edge will intersect.

34. Computer-executable software code stored on a computer readable medium, said computer-executable software code comprising:

code for receiving a resize amount for which at least a portion of a simple polygon having any number n vertices is to be resized; and code for generating an accurate result for resizing said at least a portion of said simple polygon by said received resize amount for any resize amount received, wherein the code for generating the accurate result executes in O(n log n) time or less.

35. The computer-executable software code of claim 34 wherein said resize amount comprises an amount that causes at least one resize event to be encountered when resizing said at least a portion of said simple polygon.

36. The computer-executable software code of claim 35 wherein said at least one resize event comprises at least one type of event selected from the group consisting of:
self-intersection event, edge-collapse event, and polygon-split event.

37. The computer-executable software code of claim 34 wherein said code for generating an accurate result comprises code for responding to a self-intersection event encountered when resizing said at least a portion of said simple polygon by said resize amount.

38. The computer-executable software code of claim 37 wherein said code for responding to a self-intersection event comprises:
code for resizing said at least a portion of said simple polygon by said resize amount; and
code for performing a union on the edges of the resulting resized simple polygon.

39. The computer-executable software code of claim 37 wherein said code for responding to a self-intersection event executes in O(n log n) time, where "n" is the number of vertices of said simple polygon.

40. The computer-executable software code of claim 34 wherein said code for generating an accurate result comprises code for responding to a polygon-split event encountered when resizing said at least a portion of said simple polygon by said resize amount.

41. The computer-executable software code of claim 40 wherein said code for responding to a polygon-split event comprises:
code for decomposing said simple polygon into a convex hull and at least one hole;
code for insetting at least a portion of said convex hull by said resize amount;
code for offsetting at least a portion of said at least one hole by said resize amount; and
code for unioning the resulting inset convex hull and offset at least one hole.

42. The computer-executable software code of claim 40 wherein said code for responding to a polygon-split event executes in O(n log n) time or less.

43. The computer-executable software code of claim 34 wherein said code for generating an accurate result comprises code for responding to an edge-collapse event encountered when resizing said at least a portion of said simple polygon by said resize amount.

44. The computer-executable software code of claim 43 wherein said code for responding to an edge-collapse event executes in O(n log n)time or less.

45. The computer-executable software code of claim 34 wherein said code for generating an accurate result further comprises code for detecting an edge-collapse event.

46. The computer-executable software code of claim 45 wherein said resizing at least a portion of said simple polygon comprises resizing the entire simple polygon by said resize amount, said code for detecting an edge-collapse event including:

code for computing the distance to destruction for all edges of the simple polygon; and code for determining whether the received resize amount is at least as large as the computed destructive distance for any one of the edges.

47. The computer-executable software code of claim 46 further comprising:
code for storing the computed distance to destruction for said edges in a priority queue that is prioritized by said distance to destruction.

48. The computer-executable software code of claim 34 wherein said simple polygon is a convex polygon.

49. The computer-executable software code of claim 34 wherein said simple polygon is a non-convex polygon.

50. The computer-executable software code of claim 34 wherein said simple polygon includes at least one hole.

51. A method for resizing a simple polygon comprising:
receiving a resize amount for which a simple polygon is to be resized;
detecting an edge-collapse event that is encountered when resizing said simple polygon by said resize amount; and
generating an accurate result for resizing said simple polygon by said resize amount, including generating an accurate result for any resize amount received that causes the edge-collapse event to be encountered by:
computing the distance to destruction for all edges of the simple polygon; and
determining whether the received resize amount is at least as large as the computed destructive distance for any one of the edges.

52. The method of claim 51 wherein said simple polygon comprises n vertices, said generating an accurate result executes in O(n log n) time or less.

53. The method of claim 51 wherein said simple polygon is a convex polygon.

54. The method of claim 51 wherein said simple polygon is a non-convex polygon.

55. The method of claim 51 wherein said simple polygon includes at least one hole.

56. The method of claim 51 further comprising:
storing the computed distance to destruction for said edges in a priority queue that is prioritized by said distance to destruction.

57. The method of claim 51 wherein said resizing said simple polygon comprises resizing only a portion of said simple polygon by said resize amount, said detecting an edge-collapse event comprising:
determining the speed and direction at which each vertex of said simple polygon is to be moved during the resizing of said portion of said simple polygon.

58. The method of claim 57 wherein said determining step comprises:
if both neighboring edges of a first vertex of said simple polygon are stationary, determining that the speed and distance of movement of such first vertex is zero.

59. The method of claim 57 wherein said determining step comprises:
if both neighboring edges of a first vertex of said simple polygon are non-stationary, determining that such first vertex moves outward at a speed of $1/\sin(i/2)$ for an offset operation and at a speed of $-1/\sin(i/2)$ for an inset operation, where "i" is the first vertex's interior angle.

60. The method of claim 57 wherein said determining step comprises:
if only one neighboring edge of a first vertex of said simple polygon is non-stationary, determining that such first vertex moves away from its stationary neighboring edge at a speed of −1/sin(e) for an offset operation and at a speed of 1/sin(e) for an inset operation, where "e" is the first vertex's exterior angle.

61. The method of claim 57 wherein said detecting step further comprises:

for each edge of said simple polygon, computing the point at which the vertices bounding such edge will intersect.

62. A method for resizing a simple polygon comprising:

receiving a resize amount for which at least a portion of a simple polygon is to be resized, wherein said resize amount causes at least a polygon-split event to be encountered when resizing said at least a portion of said simple polygon; and generating an accurate result for resizing said at least a portion of said simple polygon by said resize amount by:

decomposing said simple polygon into a convex hull and at least one hole;

insetting at least a portion of said convex hull by said resize amount;

offsetting at least a portion of said at least one hole by said resize amount; and     unioning the resulting inset convex hull and at least one offset hole;

wherein said generating step generates an accurate result for any resize amount received that causes a polygon-split event to be encountered.

63. The method of claim 62 wherein said simple polygon comprises n vertices, said generating an accurate result executes in O(n log n) time or less.

64. The method of claim 62 wherein said resize amount is an inset amount for which said simple polygon is to be inset.

65. The method of claim 62 wherein said resizing of at least a portion of said simple polygon comprises resizing the entire simple polygon by said resize amount.

* * * * *